(12) United States Patent
Mares

(10) Patent No.: US 7,469,536 B2
(45) Date of Patent: *Dec. 30, 2008

(54) SERIES-PARALLEL HYDROSTATIC TRANSMISSION

(75) Inventor: Riccardo Mares, Ferrara (IT)

(73) Assignee: Caterpillar Paving Products Inc., Minneapolis, MN (US)

( * ) Notice: Subject to any disclaimer, the term of this patent is extended or adjusted under 35 U.S.C. 154(b) by 249 days.

This patent is subject to a terminal disclaimer.

(21) Appl. No.: 10/824,150

(22) Filed: Apr. 14, 2004

(65) Prior Publication Data

US 2004/0228733 A1 Nov. 18, 2004

(30) Foreign Application Priority Data

Apr. 15, 2003 (EP) ................................. 03008650.8

(51) Int. Cl.
 *F16D 31/02* (2006.01)
(52) U.S. Cl. ....................................................... 60/444
(58) Field of Classification Search ................... 60/424, 60/443, 444
See application file for complete search history.

(56) References Cited

U.S. PATENT DOCUMENTS 3,458,005 A * 7/1969 Malm et al. .................... 60/424
3,788,075 A * 1/1974 Holdeman et al. ............ 60/424
3,997,017 A 12/1976 Campbell et al.
4,480,438 A 11/1984 Breeden
5,897,176 A 4/1999 Dvorak et al.
7,003,948 B2 * 2/2006 Mares ........................... 60/424
2004/0206080 A1 10/2004 Mares

FOREIGN PATENT DOCUMENTS

DE 4405472 * 8/1996
DE 19648706 6/1998
WO WO 02/093043 11/2002

* cited by examiner

*Primary Examiner*—F. Daniel Lopez
(74) *Attorney, Agent, or Firm*—Finnegan, Henderson, Farabow, Garrett & Dunner

(57) ABSTRACT

According to the present invention, an improved hydraulic transmission system is provided which includes a fluid supply adapted to supply hydraulic working fluid and having a hydraulic adjustment device for adjusting the flow rate of the hydraulic working fluid. A hydraulic control has an actuated condition in which the hydraulic control generates a hydraulic control fluid having a control pressure, which is adjustable between first and second control pressures. A first connection control operable by the hydraulic control fluid supplied from the hydraulic control is adapted to direct, upon actuation of the hydraulic control, the hydraulic control fluid to the hydraulic adjustment device. The first connection control includes a distributor having a control position in which it directs the hydraulic fluid to the adjustment device and a neutral position in which it connects the adjustment device to a tank.

26 Claims, 5 Drawing Sheets

SERIES-PARALLEL HYDROSTATIC TRANSMISSION

TECHNICAL FIELD

The present invention relates to a hydraulic transmission system and a method of operating the same. In particular, it relates to a hydraulic transmission system having at least two motors connected to one hydraulic working fluid supply means.

BACKGROUND

Hydraulic transmission systems are widely used in particular in environments where large forces and torques have to be handled. For example, one particular field of application of hydraulic transmission systems is self propelled or mobile working machines, such as construction machines or load lifting machines. Typically, in one such hydraulic transmission system, two or more motors may be connected in parallel to one hydraulic working fluid supply. Further, in case a variable displacement pump is employed as the hydraulic working fluid supply, a high motor torque can be achieved from a relatively small displacement pump, which is important in mobile working machines where space is limited.

In hydraulically operated working systems the flow of hydraulic working fluid supplied to the motors may be controlled either by a hydraulic or by an electronic control or by combinations thereof. This offers flexibility in designing the system according to the specific needs. For example, in a hydraulic system with parallel connected motors in which the flow of hydraulic working fluid in the individual branches is governed by the load on the motors, problems may arise in case one of the motors is not sufficiently loaded and the flow resistance of this transmission branch gets so low that nearly all the hydraulic working fluid supplied by the displacement pump flows through this branch. This may cause "slippage" of the respective motor and the other motor(s) will not receive enough hydraulic working fluid. Attempts to avoid such a situation include the regulation of flow in the individual branches that is controlled hydraulically and/or electronically. One prior art approach is to use flow dividers that split the flow supplied from a pump in predetermined portions at any time. This, however, causes extra pressure drop or resistance in the hydraulic transmission system and increases the overall costs. Further, in most systems, variable displacement pumps are used and also the available flow of the working fluid supply may be controlled according to the specific need and instant load of the system hydraulically and/or electronically so as to achieve optimum performance of the whole system. Yet, often the results leave room for improvements in particular concerning the reduction of complexity while achieving, at the same time, accurate smooth control of the hydraulic system and its components.

SUMMARY OF THE INVENTION

According to the present invention an improved hydraulic transmission system is provided which includes a variable supply of hydraulic working fluid and having a hydraulic adjustment device for adjusting the flow rate of the hydraulic working fluid. An actuatable hydraulic control has an actuated condition in which the actuatable hydraulic control generates a hydraulic control fluid having a control pressure which is adjustable between first and second control pressures. A first connection control is operable by the hydraulic control fluid supplied from the actuatable hydraulic control and is adapted to direct, upon actuation of the actuatable said hydraulic control, the hydraulic control fluid to the hydraulic adjustment device.

The invention also provides for a method for controlling a hydraulic transmission system, wherein the hydraulic transmission system includes a variable supply of hydraulic working fluid and having a hydraulic adjustment device for adjusting the flow rate of the hydraulic working fluid. The method includes the steps of: providing a hydraulic control fluid having a control pressure which is adjustable between a first control pressure and a second control pressure, said control pressure being indicative of a desired flow rate of the hydraulic working fluid; and selectively directing the hydraulic control fluid during an actuated condition to the hydraulic adjustment device, and operating the hydraulic adjustment device by means of the hydraulic control fluid.

BRIEF DESCRIPTION OF THE DRAWINGS

Further objects, features and advantages of the present invention will become apparent to those skilled in the art upon reading the following description of embodiments of the invention in conjunction with the appended drawings, in which.

DETAILED DESCRIPTION

Figure 1:
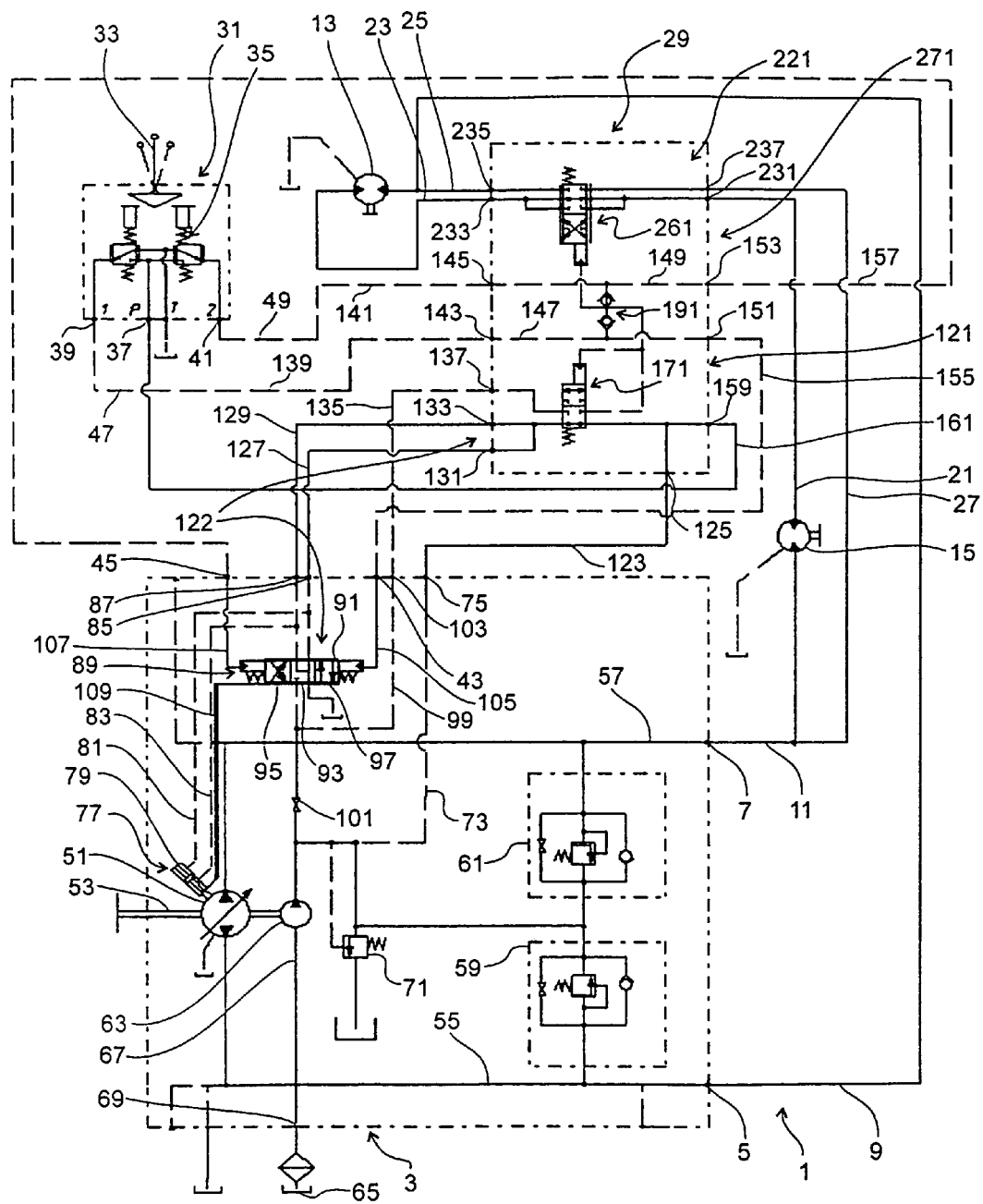
FIG. 1 shows a schematic representation of an embodiment of a hydraulic system.

FIG. 1 shows a schematic representation of a hydraulic system 1 used in a machine which may be a working machine with hydraulically driven implements such as, for example, but not restricted thereto, a compactor or asphalt roller, a skids steer loader, a hydraulic winch, a construction machine as a paver or a road scarifier with hydraulic implements and traction system, such as hydraulically driven wheels or tracks, or any other utility machine.

The hydraulic system 1 of the preferred embodiment constitutes a closed circuit connection and comprises a supply means 3 supplying a variable flow of hydraulic working fluid at first and second supply ports 5, 7 to first and second working lines 9, 11. The hydraulic system 1 also comprises a first motor or user 13 and a second motor or user 15 both being connected to the supply means 3 via the first and second working lines 9, 11, respectively. Just for reasons of explanation, the first and second motors 13, 15 may be used to drive front and rear rollers of an asphalt roller. They may be also used for driving left and right wheels of, for example, a front and/or rear axle of any self-propelled utility machine or for controlling the operation of any other working implement such as a bucket of an excavator or a conveyor in a construction machine, etc. It is also clear that more than two motors may be provided depending on the particular use of the hydraulic system 1. The circuit of the hydraulic system 1 comprising the supply means 3 and the first and second motors 13, 15 is closed via first, second, third, and fourth working line portions 21, 23, 25, 27 which are connectable via ports provided on a connection control device 29.

The hydraulic system 1 further comprises a control means 31 for facilitating manual remote control of the operation of the supply means 3 and hence the operation of the first and second motors 13, 15. The remote control means 31 is actuatable by the operator of the machine having the hydraulic transmission system, and has a control lever or joy stick 33 which is manipulated by the operator, for example, to drive the machine at a desired speed in the forward or in the rearward direction. In the preferred embodiment, the actuatable remote control means 31 is of the hydraulic type that includes a pressure variation means 35. Upon manipulating the joystick 33, the pressure variation means 35 of the hydraulic remote control means 31 vary the pressure of a hydraulic control fluid which is introduced at a constant pressure into the hydraulic remote control means 31 via a constant pressure inlet port 37. The hydraulic control fluid with varied pressure is output from the hydraulic remote control means 31 via either a first control output port 39, e.g. for forward drive, or a second control output port 41, e.g. for rearward drive in the above example of an asphalt roller. In the preferred embodiment, the modulated or varied pressure may range from 5 to 20 bar, for example, but any pressure range suited to the particular application of the hydraulic system 1 can be readily substituted.

The first and second control output ports 39, 41 are connected to first and second remote control input ports 43, 45 of the supply means 3 via first and second remote control lines 47, 49, respectively, to control operation of the supply means 3.

The supply means 3 comprises a variable displacement pump 51 which is illustrated in the preferred embodiment as a pump of the axial piston type with swash plate design driven via an input shaft 53 by means of a prime mover or engine, not shown. The variable displacement pump 51 may be also of another design suitable to supply the hydraulic working fluid at a variable flow rate. The pump 51 is connected to the first and second supply ports 5, 7 of the supply means 3 via first and second internal connection lines 55, 57. The supply means 3 also comprises first and second relief valves 59, 61 provided in an internal connection branch parallel to the first and second supply ports 5, 7 between the first and second internal connection lines 55, 57. The first and second relief valves 59, 61 protect the hydraulic system 1 against overpressure and prevent overloading of the motors 13, 15, as is known in the art.

Further, as is well known in the art, there is provided an auxiliary or boost pump 63 which serves to supply boost hydraulic fluid to the variable displacement pump 51 and hydraulic fluid at constant pressure, for example at 20 bar, for control purposes in the hydraulic system 1. The auxiliary pump 63 is connected to a hydraulic fluid tank 65 via a hydraulic fluid supply line 67 and a hydraulic fluid suction port 69 provided with a filter. The pressure of the hydraulic fluid supplied by the auxiliary pump 63 is limited by a third relief valve 71 connected to an outlet of the auxiliary pump 63 and the hydraulic fluid tank 65, as is known in the art. The outlet of the auxiliary pump 63 is also connected via an internal constant pressure line 73 to a constant pressure output port 75 of the supply means 3.

The variable displacement pump 51 comprises an adjustment means 77 for controlling the output flow of the pump 51, for example, by adjusting the angle of the swash plate of the axial piston pump. In a preferred embodiment, the adjustment means 77 is an hydraulic adjustment means and comprises, for example, a double acting servo piston 79 having its two piston chambers connected to first and second servo piston control lines 81, 83. The first and second servo piston control lines 81, 83 are internally connected to first and second constant pressure inlet ports 85, 87 of the supply means 3 and they are also internally connected to a distributor means 89. The adjustment means 77 are operated by the pressure or flow of hydraulic fluid supplied to the piston chambers of the servo piston 79 via the first and second servo piston control lines 81, 83 from the distributor means 89 and the first and second constant pressure inlet ports 85 and 87, as will be described in more detail below.

In particular, the distributor means 89 comprises a directional distributor valve 91 which has a neutral position 93 as represented in FIG. 1, and a first and second control position 95, 97 in which either the first or the second servo piston control lines 81, 83 are connected selectively to an internal servo pressure supply line 99 so as to supply pressurized hydraulic fluid to the piston chambers of the servo piston 79 to control the position thereof. In the neutral position 93 the directional distributor valve 91 connects the first and second servo piston control lines 81, 83 and the first and second constant pressure inlet ports 85, 87 to the hydraulic fluid reservoir or tank 65 in order to balance the neutral position of the servo piston 79. As will be described later, the constant pressure present at the inlet ports 85, 87 in the neutral position 93 of the distributor valve 91 is the constant pressure supplied by the auxiliary pump 63.

Contrary to conventional design in which the distributor valve 91 connects in its first or second control position 93, 95 the first and second servo piston control lines 81, 83, respectively, to the constant pressure hydraulic fluid present at the outlet of the auxiliary pump 63 to receive the full boost or charge pressure thereof, a conventional connection between the auxiliary pump 63 and the distributor valve 91 is indicated as being blocked by a plug 101. Instead, the internal servo pressure supply line 99 is connected to a servo pressure inlet port 103 of the supply means 3 receiving a pressure or flow of hydraulic fluid which is controlled in a manner to be described later.

The distributor valve 91 may be a pilot operated proportional valve. Thus, its position is controlled by a pilot or control signal, for example, in the form of pressurized fluid received via first and second distributor pilot lines 105, 107 which are connected to the first and second remote control input ports 43, 45, respectively. As indicated in FIG. 1, the distributor valve 91 also has a swash plate feedback 109, as is known in the art.

The first and second remote control input ports 43, 45, the constant pressure output port 75, the first and second constant pressure input ports 85, 87, and the servo pressure inlet port 103 of the supply means 3 are connected to a first control portion 121 of the connection control device 29 adapted to selectively connect or disconnect hydraulic fluid having a constant pressure as supplied from the auxiliary pump 63 and the hydraulic control fluid having a variable pressure as supplied from either the first or the second control output ports 39, 41 of the hydraulic remote control means 31. In other words, the hydraulic transmission system 1 comprises a first connection control means 122 adapted to direct hydraulic control fluid from the hydraulic remote control means 31 to the hydraulic adjustment means 77 of the variable displacement pump 51, the first connection control means 122 comprising the distributor means 89 and the first control portion 121 of the connection control device 29.

Specifically, the constant pressure output port 75 of the supply means 3 is connected via a first external constant pressure supply line 123 to a first input port 125 of the first control portion 121. The first and second constant pressure input ports 85, 87 of the supply means 3 are connected via second and third external constant pressure supply lines 127, 129 to first and second output ports 131, 133 of the first control portion 121. The servo pressure inlet port 103 of the supply means 3 is connected via an external servo pressure supply line 135 to a third output port 137 of the first control portion 121.

As mentioned previously, the first and second remote control input ports 43, 45 are connected via the first and second remote control lines 47, 49 to the first and second remote control output ports 39, 41, respectively, of the hydraulic remote control means 31. In particular, both the first and second remote control lines 47, 49 are connected to the first and second remote control input ports 43, 45 via the connection control device 29 and comprise respective first external line portions 139, 141 connecting the first and second remote control output ports 39, 41 with second and third input ports 143, 145 of the connection control device 29. Further, they comprise second line portions 147, 149 internal to the connection control device 29 and connecting the second and third input ports 143, 145 with fourth and fifth output ports 151, 153 of the connection control device 29. Finally there are provided third external line portions 155, 157 of the first and second remote control lines 47, 49 connecting the fourth and fifth output ports 151, 153 with the first and second remote control input ports 43, 45 of the supply means 3.

The first control portion 121 of the connection control device 29 also comprises a sixth output port 159 internally connected to the first input port 125 of the connection control device 29 and providing hydraulic fluid with the constant pressure of the auxiliary pump 63. The sixth output port 159 is connected via a fourth external constant pressure supply line 161 to the constant pressure inlet port 37 of the hydraulic remote control means 31.

The first control portion 121 of the connection control device 29 has a first switching means 171 adapted to selectively supply the hydraulic fluid with constant pressure from the auxiliary pump 63 to the first and second output ports 131, 133. In other words, the first switching means 171 is adapted to connect and disconnect the first and second output ports 131, 133 of the first control portion 121 to and from the auxiliary pump 63.

Figure 2:
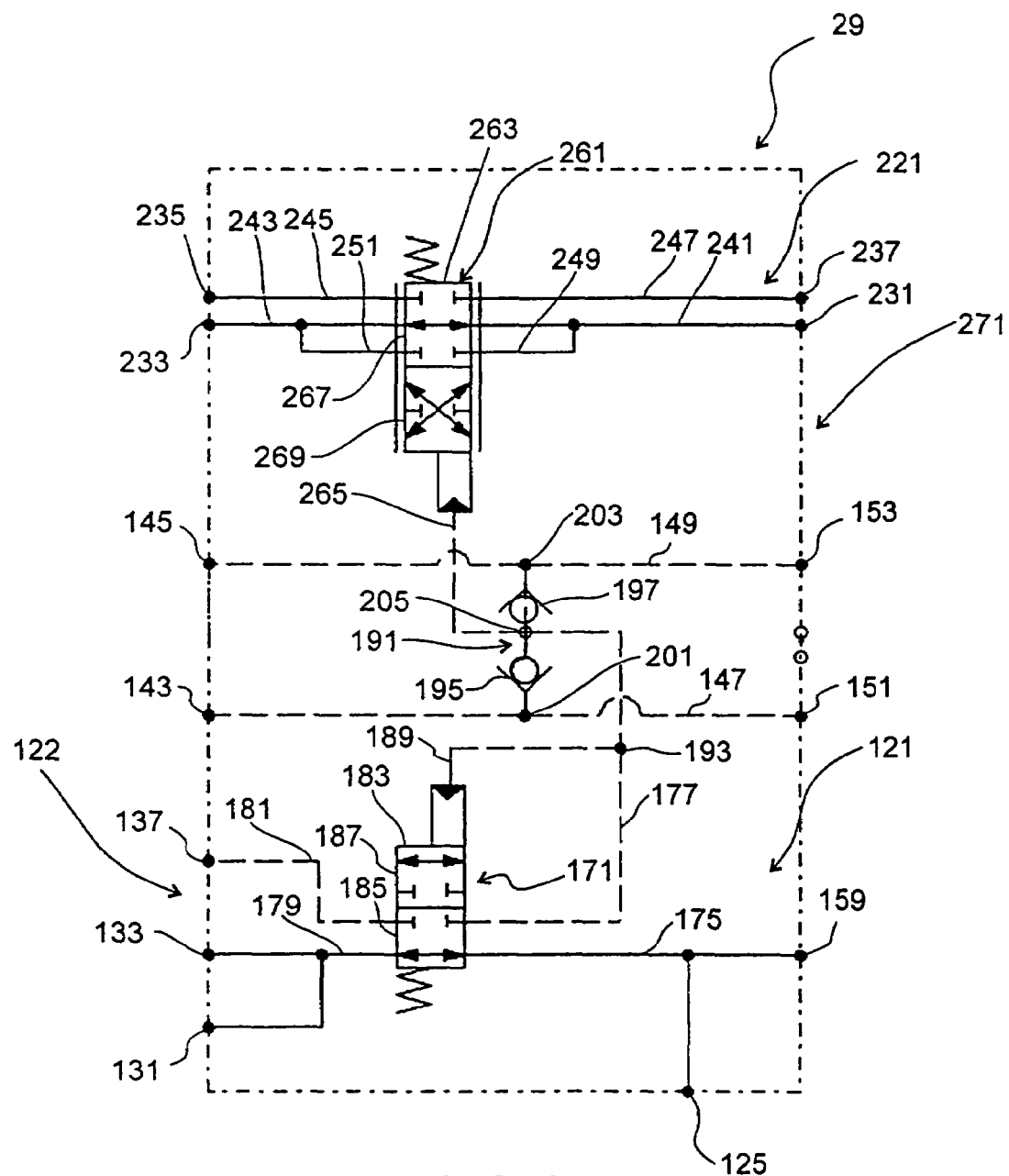
FIG. 2 shows a detail of the hydraulic system of FIG. 1.

Referring to an enlarged schematic representation of the connection control device 29 in FIG. 2, the first control portion 121 comprises a first internal connection line 175 connecting the first input port 125 to the first switching means 171 and, as mentioned above, to the sixth output port 159. The first switching means 171 is also connected to a second internal connection line 177 which is selectively connectable to one of the second or third inputs 143, 145 of the connection control device 29 to receive hydraulic control fluid varied in pressure and as output from one of the first and second control output ports 39, 41 of the hydraulic remote control means 31, as will be described later. The first switching means 171 is further connected to the first and second output ports 131, 133 via a third internal connection line 179 which is bifurcated. Finally there is provided a fourth internal connection line 181 connecting the first switching means 171 with the third output port 137.

The switching means 171 of the preferred embodiment comprises an on-off directional valve 183 which has a neutral position 185 (see FIGS. 1 and 2) in which the first internal connection line 175 is connected to the third internal connection line 179. Thus, in the neutral position 185 of the on-off directional valve 183, the hydraulic fluid having constant pressure of the auxiliary pump 63 is applied to the first and second output ports 131, 133 of the connection control means 29 and, therefore, also to the first and second constant pressure inlet ports 85, 87 of the supply means 3.

The on-off directional valve 183 also has an activated position 187 in which it connects the second internal connection line 177 to the fourth internal connection line 181 to supply the hydraulic fluid varied in pressure from one of the first and second control output ports 39, 41 of the hydraulic remote control means 31 to the servo pressure inlet port 103 of the supply means 3. In the activated position 187, the first and second output ports 131, 133 are disconnected from the constant pressure supply of the first input port 125. On the other hand, in the neutral position 185, the third output port 137 is disconnected from the hydraulic fluid as supplied from either one of the first and second control output ports 39, 41 of the hydraulic remote control means 31.

Preferably, the on-off directional valve 183 is pilot operated and connected to a first internal pilot line 189 which is selectively connectable via a second switching means 191 of the connection control device 29 to one of the first and second control output ports 39, 41 of the remote control means 31. Specifically, the first internal pilot line 189 is connected at a first connection point 193 to the second internal connection line 177, which in turn is connected to the second switching means 191 of the connection control device 29. Opening and closing of the second switching means 191, therefore, selectively supplies the hydraulic control fluid from one of the control output ports 39, 41 to the first internal pilot line 189 and the second internal connection line 177. By supplying sufficient pilot pressure via the first internal pilot line 189, the first switching means 171, i.e. the on-off directional valve 183, is switched to its activated position 187 in which the second internal connection line 177 is connected to the third output port 137. Simultaneously, the first and second output ports 131, 133 are disconnected from the constant pressure hydraulic fluid of the auxiliary pump 63 as supplied from the first input port 125. The second switching means 191, in this context, also forms part of the first connection control means 122 controlling the supply of hydraulic control fluid from the hydraulic remote control means 3 to the hydraulic adjustment means 77 of the variable displacement pump 51.

Specifically, the second switching means 191 comprises first and a second check valves 195, 197. The inlet side of the first and second check valves 195, 197, respectively, is connected in parallel to the first and second remote control lines 45, 47, in particular to their respective second line portions 147, 149 at second and third connection points 201, 203. The outlet side of the first and second check valves 195, 197 is connected via a fourth connection point 205 to the second internal connection line 177 and thus also to the first internal pilot line 189.

The hydraulic remote control means 31 receives at the constant pressure inlet port 37 the constant pressure supplied from the sixth output port 159 of the connection control means 29 and modulates the same by means of the pressure variation means 35 between a first or initial control pressure and a second or maximum control pressure. The hydraulic fluid with the modulated pressure is directed to one of the first or second control output ports 39, 41 depending on the inclination of the control lever 33, the inclination direction of which indicating a desired mode of operation of the hydraulic transmission system, e.g. a "forward" or a "rearward" drive or rotation direction of a working implement such as the forward and rear rollers of a compactor. The modulating curve or characteristics of the pressure variation means 35 can be chosen as linear or non-linear, depending on the particular situation of application. The terms initial and maximum pressures are used merely to indicate two disparate points in a range of control pressures, and are relative to a selected system design.

Once the control lever 33 is manipulated by the operator in either one of the directions indicating, for example, forward or rearward drive, a smooth modulated pressure signal is output from one of the first and second control output ports 39, 41 associated with the desired mode of operation. This modulated pressure signal is input into the connection control device 29 via one of the second and third input ports 143, 145 and operates selectively one of the first or second check valves 195, 197. As, under normal conditions, the hydraulic control fluid with sufficient pressure is only present in one of the second line portions 147, 149, and the other of the second line portions 147, 149 is depressurized, the respective one of the first or second check valves 195, 197 opens so as to communicate the hydraulic control fluid to the fourth connection point 205. The modulated pressure signal is then directed via the first connection point 193, 205 to the first internal pilot line 189 to position the on-off directional valve 183 in its activated position 187. The modulated pressure signal is also communicated via the fourth connection point 205 to the second internal connection line 177, and, in the activated position 187 of the on-off directional valve 183, it is directed via the fourth internal connection line 181 to the third output port 137 of the first control portion 121 of the connection control device 29.

The first switching means 171, when operated by manipulating the control lever 33 of the hydraulic remote control means 31 as described above, thus supplies the modulated pressure signal of the hydraulic remote control means 31 to the servo pressure inlet port 103 and the internal servo pressure supply line 99 of the supply means 3.

Figure 3:
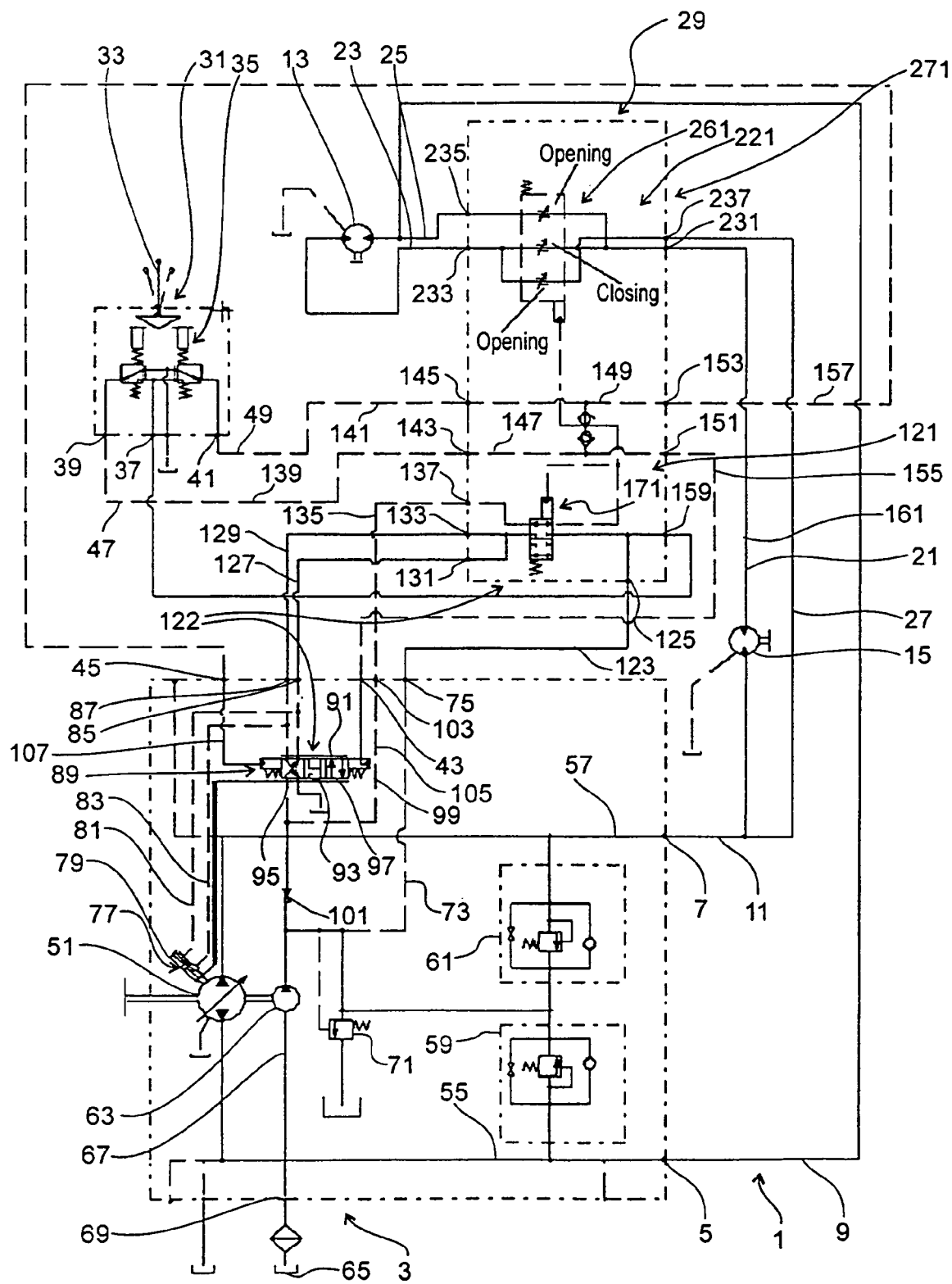
FIG. 3 shows a schematic representation of the hydraulic system of FIG. 1 in another condition.
Figure 4:
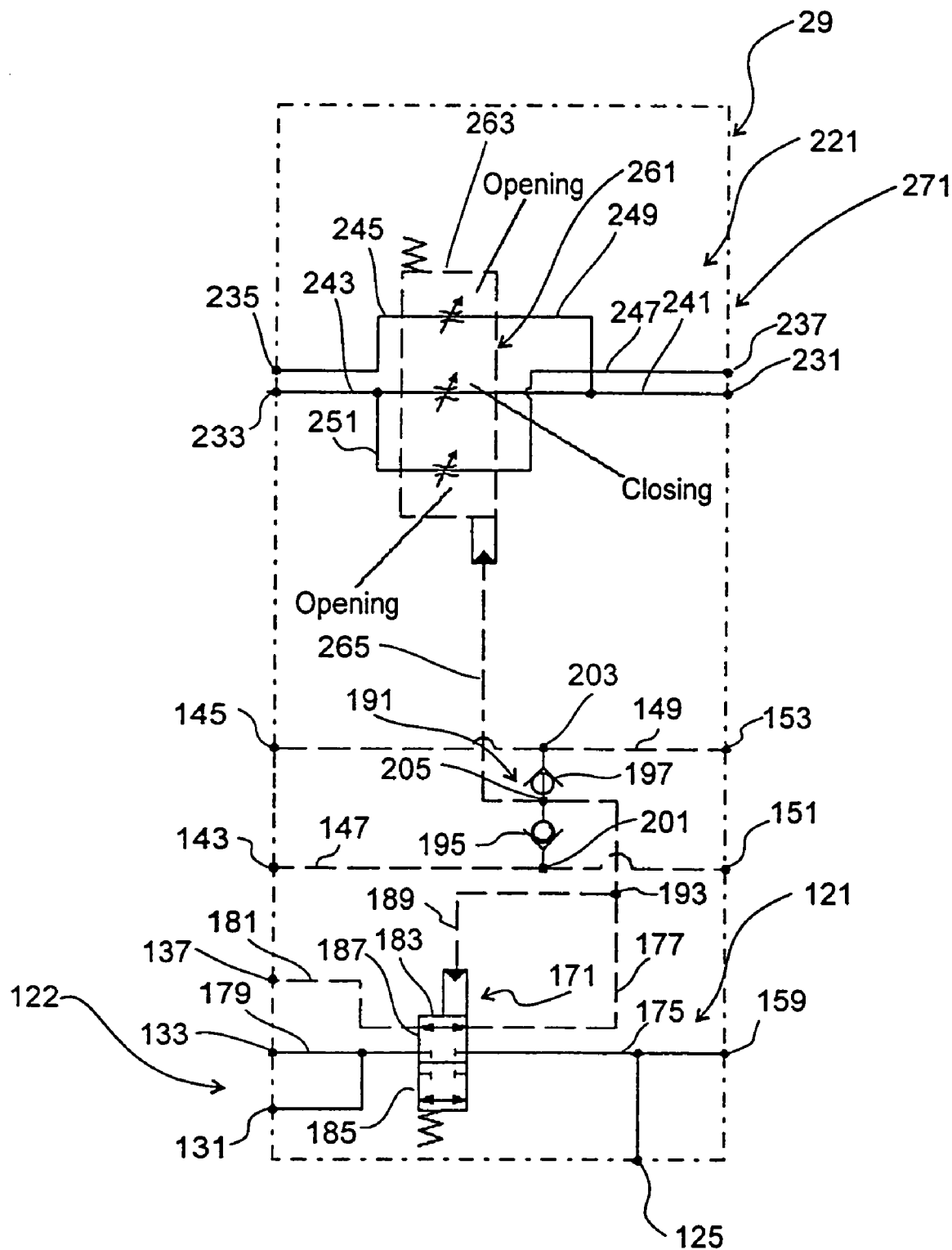
FIG. 4 shows the detail of FIG. 2 in the condition of the hydraulic system as shown in FIG. 3.

With further reference to FIGS. 3 and 4 showing the first switching means 171 in the activated position 187, at the same time the modulated pressure is sent via one of the fourth and fifth output ports 151, 153 to the respective remote control input ports 43, 45 of the supply means 3 and pilots the directional distributor valve 91 into one of its first or second control positions 95, 97 so as to communicate the modulated pressure signal present on the internal servo pressure supply line 99 to one of the piston chambers of the servo piston 79.

Thus, the first connection control means 122 comprising the distributor means 89 and the first control portion 121 is operated by the hydraulic control fluid supplied from the hydraulic remote control means 31 and directs, upon actuation of the hydraulic remote control means 31, the hydraulic control fluid to the hydraulic adjustment means 77. In particular, when operating the hydraulic remote control means 31, initially only a slight movement of the directional distributor valve 91 is permitted. Also, because of the plug 101, the full charge pressure of the auxiliary pump 63 is not applied to the servo piston 79 at once, but instead it is supplied with hydraulic control fluid having the smoothly modulated pressure from the hydraulic remote control means 31 via the internal servo pressure supply line 99 and the servo pressure input port 103.

As mentioned above and with further reference to FIG. 1, besides the function provided by the first control portion 121 relating to the control of the adjustment means 77 of the variable displacement pump 51, the connection control device 29 also provides control of the connection of the first through fourth working line portions 21, 23, 25, 27 of the closed circuit hydraulic system 1. In particular, the connection control device 29 comprises a second control portion 221 adapted to control the connection of the first through fourth working line portions 21, 23, 25, 27 so that the motors 13, 15 of the hydraulic system 1 can be selectively connected in series and/or in parallel.

As shown in more detail in FIG. 2, the second control portion 221 comprises first and second ports 231, 233 connected to the first and second working line portions 21, 23, respectively, and third and fourth ports 235, 237 connected to the third and fourth working line portions 25, 27, respectively. It further comprises first and second internal working lines 241, 243 which are respectively connected to the first and second ports 231, 233, and third and fourth internal working lines 245, 247 connected respectively to the third and fourth ports 235, 237. There are also provided first and second branch lines 249, 251 of the first and second internal working lines 241, 243, respectively.

The first through fourth internal working lines 241, 243, 245, 247 and the first and second branch lines 249, 251 are connected to a third switching means 261 of the second control portion 221 adapted to controllably connect the internal working lines 241, 243, 245, 247 and the first and second branch lines 249, 251 in a selected manner.

Preferably, the third switching means 261 comprises a proportional 6-way directional valve 263 which is pilot operated by a pilot pressure provided on a second internal pilot line 265 into a position between a first extreme position 267 as shown in FIGS. 1 and 2 and a second extreme position 269.

In the first extreme position 267 which may be also referred to as the neutral position of the proportional directional valve 263, the first and second internal working lines 241, 243 are connected and the third and fourth internal working lines 245, 247 and the first and second branch lines 249, 251 are disconnected from each other, so that effectively the first and second ports 231, 233 are connected with each other. Thus, with reference to FIG. 1, the first and second working line portions 21, 23 of the closed circuit are connected with each other and provide for a serial connection of the first and second motors 13, 15, i.e. starting from the first supply port 5 via the first working line 9 to the first motor 13, the circuit of the hydraulic system 1 is closed via the second working line portion 23, second internal working line 243, first internal working line 241, first working line portion 21 to the second motor 15 and back to the second supply port 7 via the second working line 11.

In the second extreme position 269 of the third switching means 261, the first branch line 249 is connected to the third internal working line 245 and the second branch line 251 is connected to the fourth internal working line 247 so that effectively the first and the third ports 231, 235 are connected with one another and the second and the fourth ports 233, 237 are connected with one another. Thus, the first through fourth working line portions 21, 23, 25, 27 are connected with one another so as to provide a parallel connection of the first and second motors 13, 15 in the hydraulic system 1. In particular the first motor 13 is connected to the first and second supply ports 5, 7 of the supply means via the first working line 9 leading to the first motor 13, the second working line portion 23, the second internal working line portion 243 and its second branch line 251, the fourth internal working line portion 247 and the fourth working line portion 27 back to the second supply port 7. The second motor 15 is connected to the first supply port 5 via the first working line 9, the third working line portion 25, the third internal working line portion 245, the first internal working line portion 241 and its first branch line 249, the first working line portion 21 to the second motor 15 and back to the second supply port 7 via the second working line 11.

The pilot pressure to operate the third switching means 261 is provided via the second internal pilot line 265 which is also connected to the fourth connection point 205 receiving the modulated pressure of one of the first and second remote control lines 47, 49 through one of the first and second check valves 195, 197 of the second switching means 191 of the connection control device 29. In other words, the hydraulic transmission system 1 has a second connection control means 271 comprising the second switching means 191 and the second control portion 221 and responsive to a control signal, e.g. the hydraulic control fluid supplied from the hydraulic remote control means 31, so as to control the connection of the working line portions 21 to 25 selectively between a serial and a parallel connection.

The third switching means 261 is preferably proportional, e.g. it shifts between the first extreme position 267 and the second extreme position 269 proportional to the control signal, which is in the preferred case the pilot pressure applied through the second internal pilot line 265 to the proportional 6-way directional valve 263. This pilot pressure corresponds to the smoothly modulated pressure of the hydraulic control fluid from the hydraulic remote control means 31. Thus, the third switching means 261 provides a smooth change from series to parallel connection of the first and second motors 13, 15 in the hydraulic system 1. The lower the pilot pressure, the more the third switching means 261 is positioned towards the first extreme position 267.

A 6-way valve is preferred inasmuch in changing from the series configuration of the system 1 to the parallel configuration, the first and second working line portions 21, 23 having been connected in series are initially depressurized. This type of connection is less affected by forces when operating the proportional directional valve 263.

FIGS. 3 and 4 show an intermediate state of the proportional 6-way directional valve 263 in which the connection configuration of the system 1 is transferred from series to parallel connection of the first and second motors 13, 15. It is illustrated that the higher the pilot pressure in the second pilot line 265, the more the connection between the first branch line 249 and the third internal working line 245 and the connection between the second branch line 251 and the fourth internal working line 247 are opened and the more the connection between the first and second internal working lines 241, 243 is closed.

The switching operation corresponds to opening and closing variable orifices of the proportional directional valve 263 and thus to proportional throttling which allows a smooth change of the flow rate and the pressure during the transition from serial to parallel connection of the first and second motors 13, 15. If, for example, the pilot pressure signal on the second internal pilot line 265 ranges from 5 to 20 bar, the proportional directional valve 263 allows a first switching stage (e.g. in a range of 5 to 8 bar) during which the connection is almost series, and a second switching stage during which the first and second motors 13, 15 are connected in parallel.

FIG. 3 schematically represents the hydraulic system 1 in the intermediate condition. It shows that the modulated pressure of the hydraulic remote control means 31, e.g. from the second control output port 41 acting as pilot pressure on both the first and second internal pilot lines 189, 265 has effected also switching of the first switching means 171 to the activated position 187 so as to provide the same modulated pressure to the servo piston 79. The same modulated pressure from the second control output port 41 of the hydraulic remote control means 31 acts also as pilot pressure on the second distributor pilot line 107 of the distributor directional valve 91 and has moved the same into the first control position 95 so that the servo pressure corresponding to the modulated pressure on the servo pressure supply line 99 is supplied to a selected piston chamber of the servo piston 79 via the first servo piston control line 81.

Figure 5:
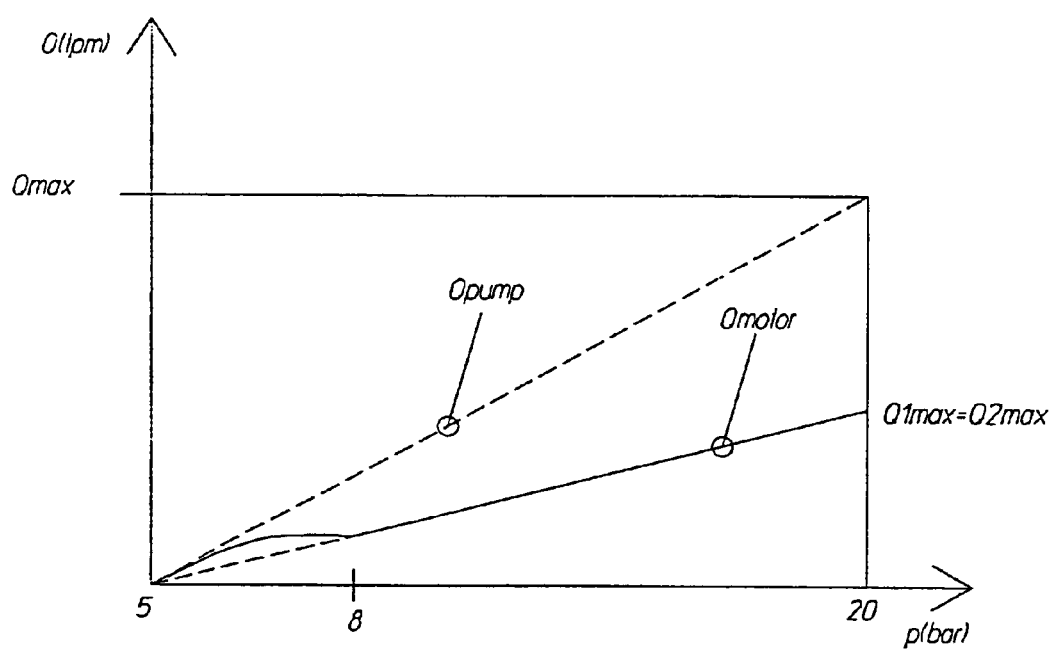
FIG. 5 shows a diagram representing a motor and pump flow rate in the system of FIG. 1.

The transition from serial to parallel connection is shown in a diagram as represented in FIG. 5 from which it can be seen that the behavior or change of the flow rate of the first and second motors 13, 15 during the transition from serial to parallel remains smooth. In the diagram of FIG. 5, the flow rate Qmotor of one of the motors 13, 15 is shown versus the pressure of the hydraulic control fluid as supplied from the hydraulic control means 31. Further, the variable flow rate of the displacement pump 51 is indicated by Qpump. The maximum flow rate of the pump 51 is Qmax. With Q1max and Q2max indicating the maximum flow rates of the two motors 13 and 15, in the specifically shown embodiment of FIG. 5, the motors 13, 15 are of identical construction and their respective maximum flow rates are the same, i.e. Q1max=Q2max.

During a first stage of operation of the hydraulic system 1, the flow rate Qmotor is equal or close to the flow rate Qpump because of the predominantly serial connection configuration in which the flow rate of the whole hydraulic system 1 is constant. In a later stage with higher pressure of the hydraulic control fluid, in the parallel connection configuration the flow rate Qpump is divided to the motors 13, 15 according to the loading. With equal loading on both motors, the flow rate Qpump is equally partitioned to the motors 13, 15 so that Qmotor substantially corresponds to one half of Qpump.

Although in the preferred embodiment the connection control device 29, i.e. the first and third switching means 171, 261, and also the directional distributor valve 91 are embodied as valves pilot operated by the hydraulic control fluid supplied by the hydraulic remote control means 31, it may be contemplated to provide a different control signal for the appropriate operation of the components of the connection control device 29 and the directional distributor valve 91. In particular, it may be envisaged to generate an electric signal indicative of the desired flow rate of the hydraulic working fluid, i.e. the operational speed of the system, which may be generated by sensing the inclination of the control lever 33, for example. Such a control signal can then be used to operate, for example by means of a solenoid, the respective switching valves. In particular, this offers an option in the case of the second connection control means 271 comprising the third switching means 261 which is provided to control the serial/parallel connection of the at least two motors 13, 15.

Although a major part of the first connection control means 122 and the second connection control means 271 are shown to be realized in one connection control device 29, it is to be noted that the second connection control means 271 controlling the connection configuration of the at least two motors 13, 15 can be realized independent from the first connection control means 122 controlling the supply of hydraulic control fluid to the hydraulic adjustment means 77 of the variable displacement pump 51. By providing the second connection control means 271 independently from the first connection control means 122 the same advantages may be achieved, as the connection of the at least two motors 13, 15 in the closed circuit hydraulic system 1 can be changed from serial to parallel configuration in response to a control signal, e.g. the pressure or flow rate of hydraulic working fluid supplied by the supply means 3.

INDUSTRIAL APPLICABILITY

According to one aspect, the hydraulic transmission system 1 is used in any closed circuit hydraulic system in which the supply means for hydraulic working fluid is connected to one or more users, as for example the motors 13, 15, in a closed circuit and in which the supply means is controlled by a hydraulic adjustment means. In hydraulic transmission systems of the prior art, no matter how fine the pressure modulation given by a pilot lever of a hydraulic remote control for operating the system, during the first instant of operation or movement of the system, one of the chambers of, for example, a servo piston of an axial piston pump, receives the full charge pressure of the auxiliary pump causing a sudden flow peak of the hydraulic working fluid in the hydraulic transmission. This can result in undesirable consequences, for example if the hydraulic transmission system is used for driving an asphalt roller or compactor this may lead to a marking which is left in the asphalt surface by the compactor upon start. Such a drawback is avoided by the improved hydraulic transmission system 1 described herein, inasmuch upon actuation of the hydraulic remote control means 31 only a slight movement of the directional distributor valve 91 is permitted at the first instant of movement of the control lever 33.

As mentioned before, in hydraulic closed circuit transmission systems of the prior art the directional distributor valve is pilot operated in a standard manner to apply the full constant pressure of the auxiliary pump to the supply lines for the hydraulic adjustment means 77. Fixed orifices are used downstream of the distributor valve to control the acceleration and deceleration ramp of the system. In such a situation it is very difficult to achieve a smooth regular ramp for the movement of a machine without using heavy duty or expensive electronics. Advantageously, the operation of the hydraulic adjustment means 77, e.g. the servo piston 79 of the variable displacement pump 51 of the hydraulic transmission system 1 of the present invention, is ramped up in a controlled and smooth manner as the hydraulic control fluid having the control pressure which is supplied from the hydraulic remote control means 31 is applied to the chambers of the servo piston 79 directly.

In a typical hydraulic traction system for a utility machine, such as an asphalt roller having front and rear rollers driven by two hydraulic motors, the motors are connected in parallel to one supply means for hydraulic working fluid, e.g. a pump such as the variable displacement pump 51. The torque developed by parallel-connected motors is flow dependent and is affected by the shaft loading on each motor. If one of the motors is not shaft loaded it may receive all the flow and the torque value is very low. In an asphalt roller, for example, this may result in slippage on the front drum or roller when the compactor is ascending an inclined road surface with a low frictional coefficient. On the other hand, a series connection may result in over pressurization of the hydraulic circuit and cavitation of the motors.

According to another aspect of the invention, the at least two motors of, for example, a front and a rear roller of an asphalt compactor are initially connected in series. Upon start of the hydraulic transmission system 1, all of the motors are provided with sufficient hydraulic working fluid so as to initiate movement of the associated working implements, e.g. the asphalt front and rear rollers. Only after the working implements have reached a desired working condition, the connection configuration of the motors is transferred to a parallel configuration depending on the pressure of the hydraulic working fluid as indicated by the variable pressure of the hydraulic control fluid.

In the preferred embodiment as described above, both the control of the hydraulic adjustment means 77 of the supply means 3 and the control of the connection configuration of the at least two motors or users 13, 15 are achieved via one common control signal, e.g. the hydraulic control fluid supplied by the hydraulic remote control means 31, which acts as the pilot signal for operating the first and second connection control means 122, 271 which comprise the first and second control portions 121, 221 of the connection control device 29 and the directional distributor valve 91. In addition, the same hydraulic control fluid is supplied to the hydraulic adjustment means 77 of the variable displacement pump 51 to smoothly control the flow of the hydraulic working fluid in the hydraulic transmission system 1. Thus, in an effective and compact manner, both the change of the connection configuration from serial to parallel and the ramp of the pressure of the hydraulic working fluid are controlled by means of one control signal, e.g. the hydraulic control fluid supplied by the hydraulic remote control means 31.

In the course of the foregoing description, various devices, assemblies, and collections of cooperating components have been referred to as "means" for purposes of simplicity in language. This is not intended to limit the description to the particular constructions described as a preferred embodiment, and those skilled in the art may find other constructions suitable for particular applications.

Other aspects, objects, advantages, and uses of the present invention can be obtained from a study of the drawings, disclosure, and appended claims.

What is claimed is:

1. Hydraulic transmission system, comprising:

a supply means adapted to supply a variable flow rate of hydraulic working fluid; said supply means having a hydraulic adjustment device for adjusting the variable flow rate of the hydraulic working fluid;

an actuatable hydraulic control having an actuated condition in which the actuatable hydraulic control generates a hydraulic control fluid having a control pressure which is adjustable between a first control pressure and a second control pressure, the first control pressure and the second control pressure supplying hydraulic control fluid and being associated with respective first and second modes of operation of the hydraulic transmission system;

a first connection control operable by said hydraulic control fluid supplied from said actuatable hydraulic control and adapted to direct, upon actuation of said actuatable hydraulic control, said hydraulic control fluid to said hydraulic adjustment device, said first connection control including a distributor connected to said hydraulic adjustment device, said distributor having a control position in which it directs said hydraulic control fluid to said hydraulic adjustment device upon actuation of said actuatable hydraulic control, said distributor further having a neutral position in which it connects the hydraulic adjustment device to a hydraulic fluid tank;

at least two working lines receiving said hydraulic working fluid at variable flow rate from said supply means;

at least two hydraulic users connected to said supply means via said at least two working lines in a closed circuit configuration;

a second connection control adapted to control the connection of working line portions connected to the at least two users; and said actuatable hydraulic control being adapted to generate a control signal indicative of pressure of the hydraulic working fluid supplied by said supply means, wherein said second connection control is responsive to said control signal so as to selectively provide serial and/or parallel connection of the at least two hydraulic users by selectively connecting said working line portions, and wherein said control signal is the hydraulic control fluid with variable pressure supplied by said actuatable hydraulic control.

2. The hydraulic system, as set forth in claim 1, wherein said distributor includes a pilot operated directional distributor valve having a distributor pilot line connected to said hydraulic control fluid from said actuatable hydraulic control and being movable into said control position upon supply of said hydraulic control fluid on said distributor pilot line so as to selectively direct said hydraulic control fluid from said actuatable hydraulic control to said hydraulic adjustment device.

3. The hydraulic system, as set forth in claim 2, wherein said first and second control outputs are connected to first and second distributor pilot lines of the directional distributor valve to move the distributor valve in an associated first or second control position, said hydraulic adjustment device being responsive to the first or second control position so as to cause said supply means to supply said hydraulic working fluid in a selected one of first and second flow directions in the hydraulic system, said first and second flow directions being associated with said first and second control positions.

4. Hydraulic transmission system, comprising:
a supply means adapted to supply a variable flow rate of hydraulic working fluid; said supply means having a hydraulic adjustment device for adjusting the variable flow rate of the hydraulic working fluid;
an actuatable hydraulic control having an actuated condition in which the actuatable hydraulic control generates a hydraulic control fluid having a control pressure which is adjustable between a first control pressure and a second control pressure, the first control pressure and the second control pressure supplying hydraulic control fluid and being associated with respective first and second modes of operation of the hydraulic transmission system;
a first connection control operable by said hydraulic control fluid supplied from said actuatable hydraulic control and adapted to direct, upon actuation of said actuatable hydraulic control, said hydraulic control fluid to said hydraulic adjustment device, said first connection control including a distributor connected to said hydraulic adjustment device, said distributor having a control position in which it directs said hydraulic control fluid to said hydraulic adjustment device upon actuation of said actuatable hydraulic control, said distributor further having a neutral position in which it connects the hydraulic adjustment device to a hydraulic fluid tank;
at least two working lines receiving said hydraulic working fluid at variable flow rate from said supply means;
at least two hydraulic users connected to said supply means via said at least two working lines in a closed circuit configuration;
a second connection control adapted to control the connection of working line portions connected to the at least two users; and
wherein said actuatable hydraulic control is adapted to generate a control signal indicative of pressure of the hydraulic working fluid supplied by said supply means;
wherein said second connection control being responsive to said control signal so as to selectively provide serial and/or parallel connection of the at least two hydraulic users by selectively connecting said working line portions; and
wherein said actuatable hydraulic control generates said hydraulic control fluid at continuously variable pressure between said first control pressure and said second control pressure; and
wherein said second connection control is adapted to control the connection of the working line portions so as to change substantially smoothly from a serial connection configuration at the initial control pressure to a parallel connection configuration at the maximum control pressure.

5. The hydraulic system, as set forth in claim 4, wherein said second connection control includes a directional valve having a first extreme position in which it connects the working line portions in a serial connection configuration of the at least two users and having a second extreme position in which it connects the working line portion in a parallel connection configuration of the at least two users, said directional valve being adapted to change its position responsive to the control signal.

6. The hydraulic system, as set forth in claim 5, wherein said directional valve is proportional and changes its position from the first extreme position to the second extreme position responsive and proportional to said control signal.

7. The hydraulic system, as set forth in claim 6, wherein said directional valve is a 6-way proportional valve adapted to depressurize the working line portions connected in a serial connection configuration when changing its position from the first extreme position to the second extreme position.

8. The hydraulic system, as set forth in claim 7, wherein said directional valve is pilot operated by said hydraulic control fluid supplied by said actuatable hydraulic control.

9. The hydraulic system, as set forth in claim 8, wherein said directional valve has a second pilot line selectively connectable to the hydraulic control fluid of the actuatable hydraulic control, said directional valve being movable from the first extreme position towards the second extreme position dependent on said varied pressure of said hydraulic control fluid.

10. The hydraulic system, as set forth in claim 9, wherein said first and second control outputs of said actuatable hydraulic control are selectively connectable to said second pilot line of said directional valve.

11. The hydraulic system, as set forth in claim 10, wherein said second switching device of said hydraulic system also is adapted to connect the second pilot line of the directional valve to a selected one of the first or second control outputs of the actuatable hydraulic control.

12. The hydraulic system, as set forth in claim 11, wherein said second switching device includes first and second check valves having their respective inputs connected to the first and second control outputs of the actuatable hydraulic control and having their respective outputs connected to the second pilot line of the directional valve.

13. A method for controlling a hydraulic transmission system, said hydraulic transmission system having a hydraulic pump for supplying hydraulic working fluid at variable flow rate; wherein said pump includes a hydraulic adjustment device for adjusting the variable flow rate of the hydraulic working fluid;
said method comprising the steps of:
providing a hydraulic control fluid having a control pressure which is adjustable between a first control pressure and a second control pressure, said control pressure being indicative of a desired flow rate of the hydraulic working fluid;

selectively directing said hydraulic control fluid during an actuated condition to said hydraulic adjustment device, and operating said hydraulic adjustment device by means of said hydraulic control fluid; and wherein said actuated condition during which said hydraulic control fluid is selectively directed to said hydraulic adjustment device corresponds to providing said hydraulic control fluid with said first control pressure; and said hydraulic pump being adapted to supply hydraulic working fluid at variable flow rate to at least two working lines, and said hydraulic system including at least two hydraulic users connected to said pump via said at least two working lines in a dosed circuit configuration; and further including:

providing a control signal indicative or a desired flow rate of the hydraulic working fluid supplied by said pump;

controlling the connection of working line portions connected to the at least two users so as to selectively provide serial and parallel connection of the at least two hydraulic users in response to said control signal; and wherein said control signal is continuously variable between a first control signal value and a second control signal value; and said connection of the working line portions is controlled so as to change substantially smoothly from a serial connection configuration at said first control signal value to a parallel connection configuration at said second control signal value.

14. The method, as set forth in claim 13, including the step of, in a non-actuated condition, providing hydraulic fluid at constant pressure to said hydraulic adjustment device and connecting the same to a tank of hydraulic fluid.

15. The method, as set forth in claim 14, wherein said hydraulic transmission system Includes a first connection control adapted to selectively direct said hydraulic control fluid to said hydraulic adjustment device, said method including the step of operating said first connection control by said hydraulic control fluid.

16. The method, as set forth in claim 13, wherein said connection of the working line portions is controlled by a second connection control operated by said control signal.

17. The method, as set forth in claim 16, wherein said second connection control is operable by a hydraulic pilot pressure, wherein said control signal is provided in the form of said hydraulic control fluid having variable pressure corresponding to the desired pressure of the working fluid, and wherein said method further includes the step of pilot operating said second connection control by said hydraulic control fluid.

18. Hydraulic transmission system, comprising:

a supply means adapted to supply a variable flow rate of hydraulic working fluid; said supply means having a hydraulic adjustment device for adjusting the variable flow rate of the hydraulic working fluid;

an actuatable hydraulic control having an actuated condition in which the actuatable hydraulic control generates a hydraulic control fluid having a control pressure which is adjustable between a first control pressure and a second control pressure;

a first connection control operable by the hydraulic control fluid supplied from the actuatable hydraulic control and adapted to direct, upon actuation of the actuatable hydraulic control, the hydraulic control fluid to the hydraulic adjustment device; and the first connection control including a distributor connected to the hydraulic adjustment device, the distributor having a control position in which it directs the hydraulic control fluid to the hydraulic adjustment device upon actuation of the actuatable hydraulic control, the distributor further having a neutral position in which it connects the hydraulic adjustment device to a hydraulic fluid tank, the first connection control further including a first switching device adapted to connect a supply line of the distributor to the hydraulic control fluid from the actuatable hydraulic control in response to actuation of the actuatable hydraulic control; and wherein the first switching device is adapted to connect the hydraulic adjustment device to a supply of hydraulic fluid having constant pressure in the non activated condition of the actuatable hydraulic control and to disconnect the supply of hydraulic fluid having constant pressure from the hydraulic adjustment device in the activated condition of the actuatable hydraulic control.

19. The hydraulic system, as set forth in claim 18, wherein said first switching device is a pilot operated directional on-off valve having an activated position in which the directional on-off valve directs said hydraulic control fluid from said actuatable hydraulic control to the distributor.

20. The hydraulic system, as set forth in claim 19, wherein said directional on-off valve has a first pilot line selectively connectable to the hydraulic control fluid of the actuatable hydraulic control means, said directional on-off valve being movable to its activated position upon receiving hydraulic control fluid on said first pilot line.

21. The hydraulic system, as set forth in claim 20, wherein said hydraulic system includes a second switching device adapted to connect the first pilot line of the directional on-off valve to a selected one of the first or second control outputs of the actuatable hydraulic control.

22. The hydraulic system, as set forth in claim 21, wherein said second switching device includes first and second check valves having their respective inputs connected to the first and second control outputs of the actuatable hydraulic control and having their respective outputs connected to the first pilot line of the directional on-off valve.

23. The hydraulic system, as set forth in claim 22, wherein said second switching device selectively directs hydraulic control fluid of one of the first and second outputs of the actuatable hydraulic control to a control fluid input of the directional on-off valve, said control fluid input being connected to a control fluid output of the directional on-off valve in its activated position.

24. The hydraulic system, as set forth in claim 23, wherein said supply means includes a variable displacement pump of the axial piston type with swash plate design and said hydraulic adjustment device includes a double acting servo piston connected to said variable displacement pump.

25. The hydraulic system, as set forth in claim 24, wherein, in said control position, said directional on-off valve directs said hydraulic control fluid from the actuatable hydraulic control to an associated one of the piston chambers of the servo piston.

26. The hydraulic system, as set forth in claim 25, wherein said directional on-off valve has a neutral position in which no hydraulic control fluid is supplied to the first pilot line, and wherein said neutral position of said directional on-off valve connects both chambers of the servo piston to a tank to balance the position of said servo piston.

* * * * *